US006568169B2

(12) United States Patent

Conde et al.

(10) Patent No.: US 6,568,169 B2

(45) Date of Patent: May 27, 2003

(54) FLUIDIC-PISTON ENGINE

(76) Inventors: Ricardo Conde, 113 Michael La., New Salem, MA (US) 01355; Dara Faroughy, 84 South St., Athol, MA (US) 01331

(*) Notice: Subject to any disclaimer, the term of this patent is extended or adjusted under 35 U.S.C. 154(b) by 0 days.

(21) Appl. No.: 09/847,141

(22) Filed: May 2, 2001

(65) Prior Publication Data

US 2002/0162316 A1 Nov. 7, 2002

(51) Int. Cl.[7] .................................................. F02C 5/00

(52) U.S. Cl. .......................................... 60/39.6; 60/520

(58) Field of Search .......................... 60/39.6, 517, 520

(56) References Cited

U.S. PATENT DOCUMENTS

| | | | | | |
|---|---|---|---|---|---|
| 1,614,962 | A | | 1/1927 | Koenig | |
| 2,215,625 | A | | 9/1940 | Quinte | 60/7 |
| 2,755,619 | A | | 4/1956 | Sheft | 60/23 |
| 2,814,551 | A | | 11/1957 | Broeze et al. | 23/1 |
| 3,319,416 | A | | 5/1967 | Renshaw | 60/24 |
| 4,016,719 | A | * | 4/1977 | Yavnai | 60/416 |
| 4,199,945 | A | | 4/1980 | Finkelstein | 60/520 |
| 4,240,256 | A | * | 12/1980 | McDougal | 60/518 |
| 4,330,992 | A | * | 5/1982 | Senft | 60/518 |
| 4,382,362 | A | * | 5/1983 | Mortel et al. | 60/517 |
| 4,428,197 | A | | 1/1984 | Lilequist | 60/525 |
| 4,498,298 | A | | 2/1985 | Morgan | 60/525 |
| 4,676,066 | A | | 6/1987 | Tailer et al. | 60/517 |
| 4,676,067 | A | | 6/1987 | Pinto | 60/525 |
| 4,724,899 | A | * | 2/1988 | Frates et al. | 138/38 |
| 4,816,121 | A | * | 3/1989 | Keefer | 204/156 |
| 4,924,956 | A | | 5/1990 | Deng et al. | 180/65.3 |
| 5,077,976 | A | * | 1/1992 | Pusic et al. | 60/525 |
| 5,195,321 | A | * | 3/1993 | Howard | 60/525 |
| 5,822,964 | A | * | 10/1998 | Kerpays, Jr. | 60/523 |
| 5,850,111 | A | | 12/1998 | Haaland | 310/15 |
| 5,934,076 | A | * | 8/1999 | Coney | 60/617 |

FOREIGN PATENT DOCUMENTS

| | | |
|---|---|---|
| DE | 3709266 | 9/1988 |
| JP | 61261647 | 11/1986 |

OTHER PUBLICATIONS

Budliger, Jean–Pierre; Stirling Technology for the Home, A practical Stirling–Stirling Heat Pump with a Resonance Tube; vol. 13, No.4, 1995, pp 31–34, IEA Heat Pump Centre Newsletter.

* cited by examiner

*Primary Examiner*—Hoang Nguyen

(74) *Attorney, Agent, or Firm*—Cantor Colburn LLP

(57) ABSTRACT

An external combustion engine comprises a mass of compressible working fluid; a fluidic piston in fluid communication with the working fluid; and a second piston in hydraulic communication with the fluidic piston and in fluid communication with the working fluid.

3 Claims, 5 Drawing Sheets

FLUIDIC-PISTON ENGINE

BACKGROUND

Stirling engines refer to a specific class of external combustion heat engines that convert heat differentials into mechanical energy with relatively high conversion efficiencies. Such efficiencies for a class of optimized Stirling engines can surpass most known air-breathing internal combustion engines, and utilize a regenerator to store or release fluid heat during the engine cycle. Such Stirling engines can approach the efficiency of an ideal Carnot cycle.

Heat engines can be used in a variety of applications. For example, as prime movers, cooling systems, cryogenic coolers, heat pumps or pressure generators in a variety of design forms and operating sizes. Current applications range in size from large power generators to miniature engines for artificial hearts. Stirling engines thus far developed vary in output power from as little as a few watts to as much as 1MW (1MW=1341 hp). High temperature Stirling engines may operate at temperatures exceeding 1000 K, with mean working fluid pressures in the range of one atmosphere to as high as 20 MPa (1 MPa □ 10 atmospheres).

Conventional Stirling engines utilize the roughly steady-state expansion of a highly compressed fixed number of light molecular mass working fluid, such as helium, hydrogen or air, in contact with a heat source at a substantially fixed temperature for their power stroke; followed by forced convection heat transfer or gas cooling by contact with a heat sink to generate engine speeds ranging from low to high frequency, typically measured in revolutions per minute.

Since the essential ingredient needed to operate a Stirling engine is an appropriate external heat source such as, for example, solar, natural gas, fossil fuel, oil, coal, waste heat or geothermal energy; this makes the Stirling engine well suited for not only terrestrial applications but also for large scale space and underwater applications, including spacecraft and submarines.

Any conventional (non-rotary) type Stirling engine requires simple components for its operation. It requires internal pistons as the means for displacing and compressing the working fluid therein and to generate output power. The pistons receive work during their up-stroke (compression), and generate greater work during their down-stroke (expansion), followed by a transfer of heat at some temperature by the working fluid to the surrounding heat sink. The power pistons are usually equipped with high performance fluid rings to assure and maintain a high pressure differential between their upper and lower faces.

Regenerators, which are placed between the hot and cold heat exchangers, optimally recycle the heat supply and transfer process by acting as thermodynamic sponges. Their function is to receive heat from the working fluid during the fluid passage from the high to low temperature space, and to release heat to the working fluid during the fluid passage back from the low to high temperature space.

Generally, the system efficiency and the cyclic work output are functions of both thermodynamic variables, such as pressure, and the internal volumetric compression ratio. From a thermodynamic standpoint, an ideal reversible four-path Stirling cycle when depicted in the pressure (P) versus volume (V) diagram consists of two isothermal (constant temperature) and two isochoric (constant volume) processes in sequence. When depicted in the temperature (T) versus entropy (S) diagram, the heat energy transfer in the process is proportional to the area enclosed in the T-S diagram ($\oint SdT$). Likewise, the work done by the engine is proportional to the area enclosed on the P-V diagram ($\oint PdV$).

Disadvantages of conventional Stirling engines include the use of relatively expensive and heavy materials, such as Inconel® and other alloy steels, for the high temperature structural components (e.g., pistons, cylinders and regenerators). In addition, the use of seals at the piston connecting rod is a serious factor for limiting the useful life of the engine and is a well-known cause for downgrading the engine's overall efficiency. Further, these seals are specialized designs and are correspondingly expensive to produce, and typically do not perform an adequate function in preventing leakage of high-pressure working fluid.

Conventional high temperature Stirling engines generally operate at high rotational velocities of typically about 3000 RPM. This is one prime reason for the reduction of the regenerator efficiency, and causes a marked increase in frictional losses from the high velocity motion of the working fluid. Other adverse effects due to high temperatures, typically about 720° C., include the high heat losses due to the blackbody radiation. Although the low to middle temperature types of Stirling engines (<450° C.) can alleviate some of these losses, the price to pay is a lower Carnot efficiency. There also remain numerous other drawbacks, deficiencies, and disadvantages associated with conventional Stirling engines. One disadvantage is the premature failure of the seal between the connecting rod, which exhibits its complex translational and rotational motions, and the mechanical drive linkage, despite expensive seal designs. A further disadvantage is the mechanical coupling of all adjacent pistons that results in a fixed phase angle relationship, which prevents optimization of the engine.

Since a Stirling engine is a device based on an oscillatory and forced convection of the working fluid, parasitic losses of the engine are related to the frequency of the operation. The higher the frequency the worse are certain performance losses. For a fixed target power, the lower frequency engine may be preferable. Reduction of unnecessary dead space volumes that do not participate in power generation and overall operation is desirable in the design of an optimized Stirling engine.

SUMMARY

The above-described and other problems or disadvantages of the prior art are overcome or alleviated by a fluidic piston engine in which a fluidic piston is in fluid communication with a mass of compressible working fluid; and a second piston is in hydraulic communication with the fluidic piston and in fluid communication with the working fluid.

These and other features are further exemplified by an external combustion engine comprising at least four upright cavities disposed substantially equidistant from a central upright axis, a compressible working fluid in fluid communication between each pair of adjacent cavities; and at least one linkage in reciprocal phase communication between each pair of alternate cavities.

BRIEF DESCRIPTION OF THE DRAWINGS

Referring now to the drawings wherein like elements are numbered alike in the several Figures.

DESCRIPTION OF PREFERRED EMBODIMENTS

Figure 1:
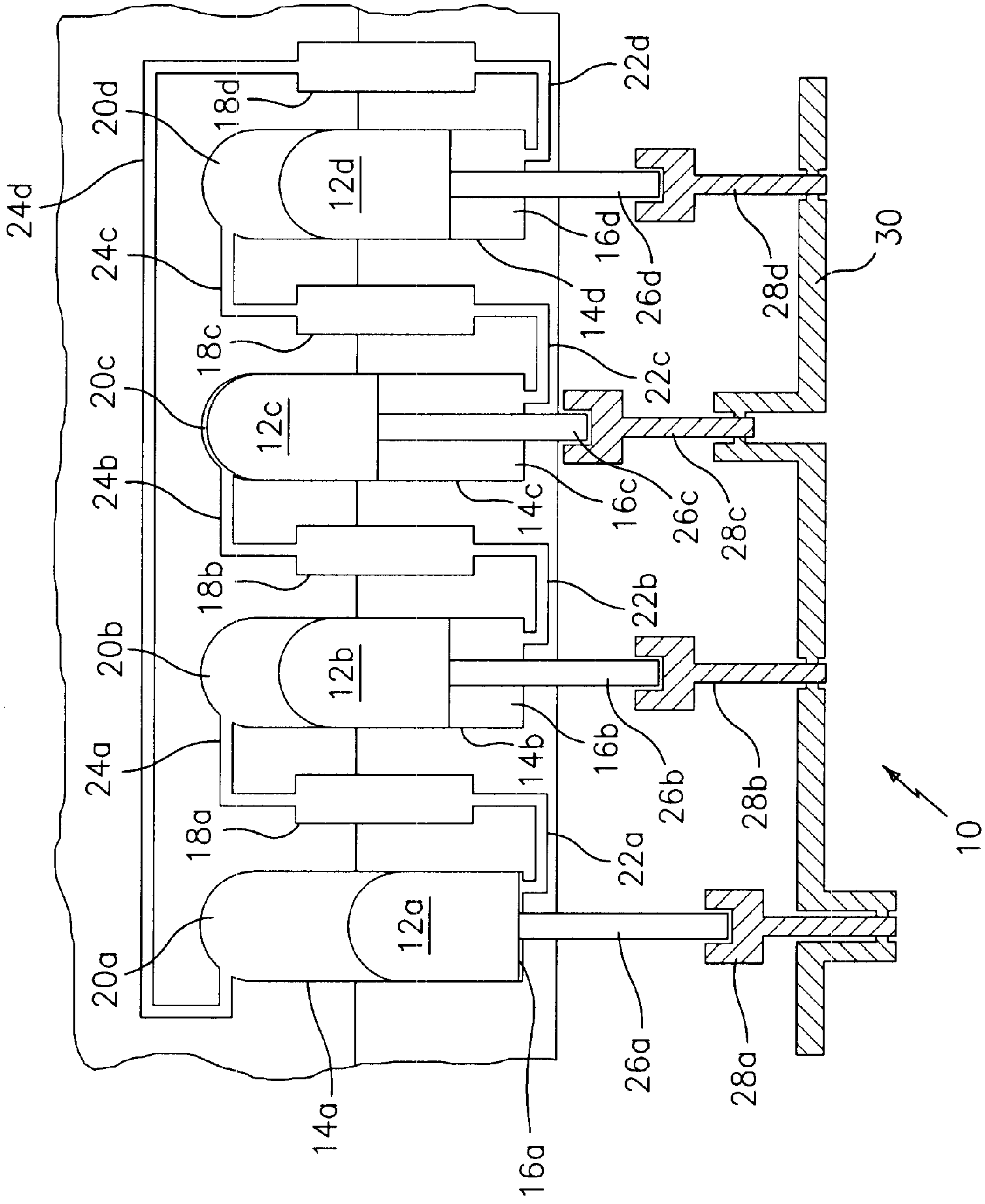
FIG. 1 (PRIOR ART)
FIG. 1 is a schematic representation of a prior art Stirling engine.

As shown in FIG. 1, a prior art double-acting multi-cylinder Stirling engine is indicated generally by the reference numeral 10. The engine 10 has one reciprocating element 12*a*–12*d* per cylinder 14*a*–14*d*, respectively, and is generally designed such that the compression space 16*a*–16*d* of each cylinder 14*a*–14*d*, respectively, is connected through an associated heat exchanger 18*a*–18*d*, respectively, to the expansion space 20*a*–20*d* in an adjacent cylinder 14*a*–14*b*, respectively, via associated passageways 22*a*–22*d*, 24*a*–24*d*. As used herein, the term heat exchanger shall include a cooler, a regenerator or a heater, or any combination thereof.

Compression space 16*a* of cylinder 14*a* is connected through regenerator 18*a* via passageways 22*a* and 24*a* to the expansion space 20*b* of the adjacent cylinder 14*b*. The three adjacent cylinders 14*b*–14*d* are similarly connected. Here, each piston 12*a*–12*d* has two functions: (1) to transmit the power to the output shafts 26*a*–26*d*, respectively; and (2) to cause fluid motion to and from the two sets of variable spaces 16*a*–16*d*, and 20*a*–20*d*. This configuration is known in the art as the Rider configuration. The connecting rods 28*a*–28*d*, which are coupled to the output shafts 26*a*–26*d*, respectively, are sealed from the environment, which tends to decrease the engine's efficiency as will be further described. Conventional Rider configuration Stirling engines depend on some mechanical linkage or crankshaft 30 to transmit power from the connecting rods 28*a*–28*d*. Such linkages include crankshafts, rhombic drives, swash plates and slider-cranks. Because the pistons 12*a*–12*d* are mechanically linked via the crankshaft 30, for example, the thermodynamic state of one cylinder may not be optimized relative to an adjacent cylinder.

Figure 2:
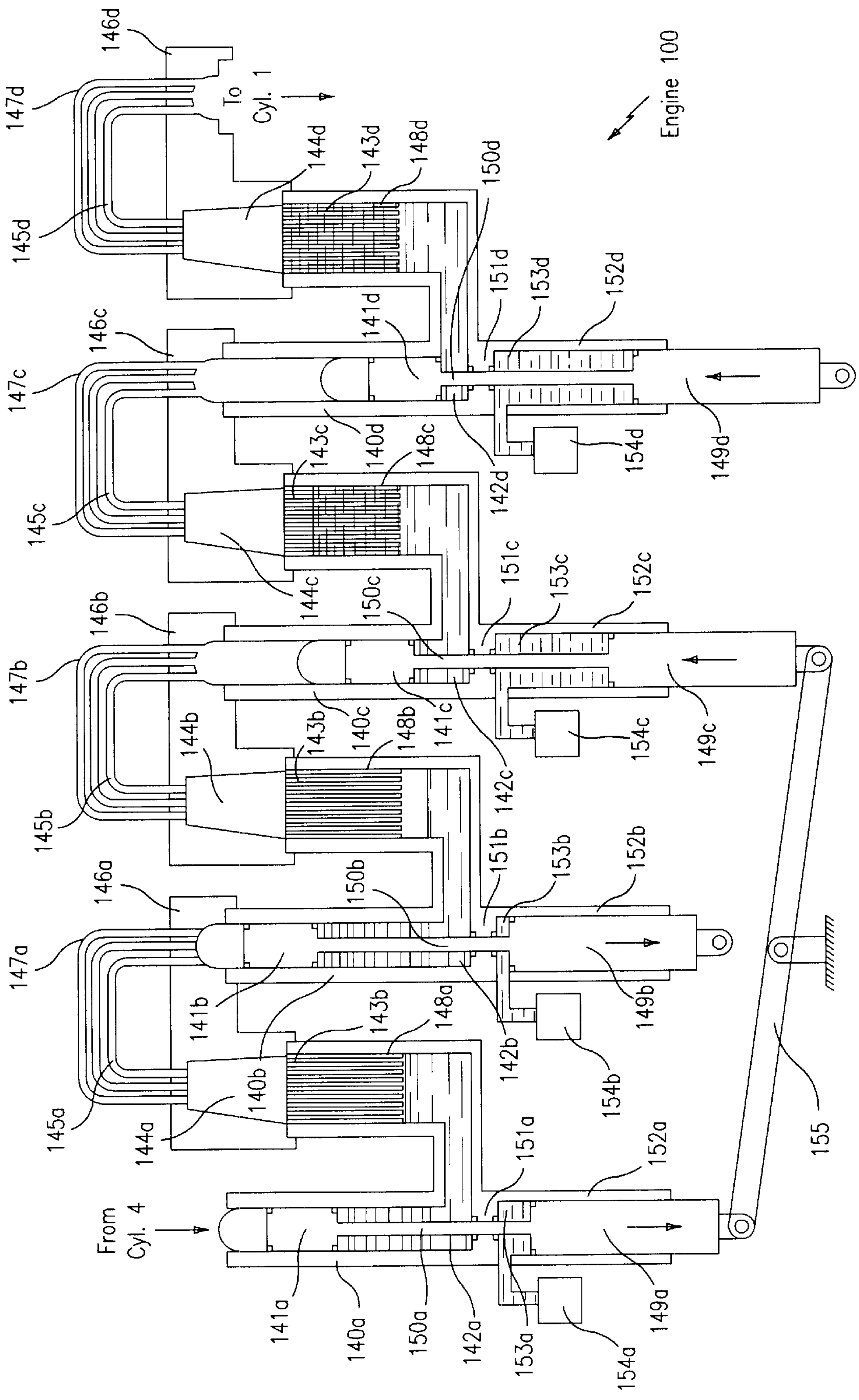
FIG. 2 is a schematic representation of a first exemplary embodiment Fluidic-Piston engine.

Turning now to FIG. 2, an exemplary embodiment Fluidic-Piston engine is indicated generally by the reference numeral 100. Engine 100 is an external combustion engine that includes a plurality of rigid pistons 141*a*–141*d* disposed upright in a plurality of corresponding chambers, cavities or cylinders 140*a*–140*d*, respectively. The cylinders 140*a*–140*d* are formed in a cylinder block (not shown), which may include cylinder heads 146*d* or 146*a*–146*c* that are also known as heater heads. As used herein, "cylinder block" shall include a single block or a multi-component structure, which, when coupled together, functions as the cylinder block of the engine 100. Each rigid piston 141*a*–141*d* is in contact along its bottom surface with a corresponding substantially incompressible fluidic piston 142*a*–142*d*, respectively. The cylinders 140*a*–140*d* are physically arranged in a two-by-two matrix with each other such that each cylinder is vertically oriented and equidistant from each of two adjacent cylinders.

Although the fluidic pistons 142*a*–142*d* are preferably liquid, other relatively incompressible fluids, including gels, may be used. The material of the fluidic piston may be chosen from water, glycols (such as ethylene glycol, propylene glycol or other glycols), DOWTHERM®, aromatics, silicones, and similar substantially incompressible fluids for serving the function of the fluidic piston described herein. In general, the material of the fluidic piston will preferably exhibit substantial incompressibility relative to a working fluid, high boiling point, high breakdown temperature (including auto-ignition and/or dissociation temperatures), low density, low viscosity change under design conditions, low viscosity at lower temperatures, low vapor pressure and immiscibility with the chosen working fluid. Functions of the fluidic piston may include displacing a volume of working fluid, lubricating piston and engine seals, and preventing high-pressure gaseous working fluid from leaking between the internal passageways of the engine and an external environment by means of a gas to liquid barrier. Each cylinder 140*a*–140*d* defines a compression space 143*a*–143*d*, respectively, defined by the volume above each fluidic piston 142*a*–142*d*, respectively, and below each regenerator 144*a*–144*d*, respectively; and an expansion space 145*d* or 145*a*–145*c* defined by the volume above each rigid piston 141*a*–141*d*, respectively, and above each regenerator 144*d* or 144*a*–144*c*, respectively. The compression space 143*a*–143*d* of each cylinder 140*a*–140*d*, respectively, is thermodynamically coupled to a corresponding heat exchanger or regenerator 144*a*–144*d*, respectively, and connected to the expansion space 145*a*–145*d*, respectively, of an adjacent cylinder 140*b*–140*d* or 140*a*, respectively, via associated passageways or tubes 147*a*–147*d*, respectively. For example, the compression space 143*a* of cylinder 140*a* is connected through passageways or tubes 148*a* to the regenerator 144*a*, and, in turn, through the tubes 147*a* to the expansion space 145*a* of the adjacent cylinder 140*b*.

Hence, the pistons 141*a*–141*d* that move away under force from the expanding working fluid are called power or expansion pistons, and the pistons 142*a*–142*d* that move to compress the working fluid are called compression pistons. In alternate embodiments, a single piston may be substituted to fulfill the functions of an expansion piston and a compression piston. The compression 143*a*–143*d* and expansion spaces 145*d* or 145*a*–145*c* are occupied during the engine cycle by a substantially fixed mass of working fluid, such as, for example, air, hydrogen, helium, or other working fluids having suitable heat-transfer and thermodynamic properties for serving the functions of the working fluid described herein.

The exemplary engine 100 includes a second set of transfer pistons 149*a*–149*d*, which are directly and rigidly connected to pistons 141*a*–141*d*, respectively, in an axial relationship. Pistons 149*a*–149*d* are connected to pistons 141*a*–141*d*, respectively, via shafts 150*a*–150*d*, respectively, passing through shaft ports 151*a*–151*d*, respectively, which may be formed entirely within the cylinder block to effectively seal the shaft. The second set of pistons 149*a*–149*d* are housed within chambers or cylinders 152*a*–152*d*, respectively.

Each cylinder 152*a*–152*d* includes a volumetric space 153*a*–153*d*, for hydraulic fluid to ingress and egress during each stroke. For example, piston 141*a* in the expansion mode is rigidly connected to piston 149*a*, which, in turn, transfers the force of expansion through an articulated mechanical linkage 155 to piston 149*c*. Thus, the pistons 141*a* and 141*c* are maintained in an opposite phase relationship of 180 degrees. A second linkage (not shown) similarly transfers expansion forces between pistons 149*b* and 149*d* and thus maintains the pistons 141*b* and 141*d* in an opposite phase relationship.

Although alternate pistons such as 141*a* and 141*c* are maintained in a phase relationship of 180 degrees, the phase relationship between adjacent pistons such as between pistons 141*a* and 141*b* is not fixed at 90 degrees, and is gas dynamically variable between about 0 to about 180 degrees during portions of an engine cycle. It shall be recognized that the instantaneous phase relationship between one pair of adjacent pistons is equal to the instantaneous phase relationship between the other pair of adjacent pistons. Thus, if piston 141*a* leads piston 141*b* by 135 degrees, for example, at a point in its expansion stroke; then piston 141*c* leads piston 141*d* by 135 degrees at an opposite point in its compression stroke. These phase differentials between adjacent pistons will tend towards 90 degrees or ¼ engine cycle at about a mid-point of the travel of each piston 141*a*–141*d* due to the balancing effect of the linkages 155.

Unlike the crankshaft 30 of FIG. 1, the linkage 155*a* need not make a full rotation to guide the pistons 141*a*, 141*c* through a complete cycle. Thus, the stroke length and corresponding compression ratio for each piston 141*a*–141*d* is not fixed by the linkage 155*a*, but may automatically vary from a relatively small stroke up to the limits of travel of the pistons 141*a*–141*d* according to the thermodynamic conditions in the working fluid.

At the same time that piston 141*a* displaces the fluidic piston 142*a*, which compresses and displaces the working fluid in the compression space 143*a*, piston 149*c* displaces the hydraulic fluid from the volume space 153*c* through valve 154*c* that controls the flow of hydraulic fluid into and out of the cylinder 152*c*. This hydraulic fluid can then be used to drive a conventional hydraulic motor (not shown) for production of rotational motion.

Each fluidic piston 142*a*–142*d* is substantially incompressible and at least partially disposed in the corresponding cylinder 144*d* or 144*a*–144*c*, respectively, which is formed in the cylinder block (not shown). Each fluidic piston 142*a*–142*d* also extends into the tube set 148*a*–148*d*, respectively, during a portion of each thermodynamic cycle, thereby displacing substantially all of the working fluid from the tube set 148*a*–148*d* into the corresponding heat-exchanger 144*a*–144*d*, respectively, when the corresponding rigid piston 141*a*–141*d*, respectively, is at the bottom of its travel.

Engine 100 may further include conventional features such as piston rings connected to the rigid pistons 141*a*–141*d* and/or 149*a*–149*d*, a cooling system coupled to the cylinder block and/or cylinder heads 146*d* or 146*a*–146*c*, and magnetic couplings coupled to the pistons 141*a*–141*d* for generating power. These items have not been shown in the drawings for the sake of clarity.

According to this exemplary Fluidic-Piston engine embodiment, since the non-adjacent pistons of opposite phase are linked to each other via the linkages 155*a*, the effect is that any piston in the power or expansion mode belonging to a given cylinder becomes, during a given half-cycle time, the complementing driving means for the compression or displacement mode of the oppositely disposed piston. Thus, as specifically shown in FIG. 2, pistons 142*a* and 142*b* are in the power or expansion mode, while pistons 142*c* and 142*d* are in the compression or displacement mode. The arrows on the pistons 149*a*–149*d* indicate the directional motion of each oppositely disposed piston at this particular phase in the engine cycle. Due to the inherent operational symmetry of the engine 100, the reversing of this process occurs during the second half-cycle time for the engine. As such, any pair of linked pistons belonging to two opposite phase cylinders will oscillate substantially in reciprocal register with one another.

Accordingly, the engine 100 provides a continuously gas dynamically variable inter-cylinder phase relationship as well as a dynamically variable stroke length and compression ratio, each of which are either actively controlled or inherently varied by the thermodynamic conditions in the working fluid to optimize the efficiency of the thermodynamic cycle.

As may be recognized by those of ordinary skill in the pertinent art, the pistons 141*a*–141*d* and/or 149*a*–149*d* may be substituted with other displacement devices, such as, for example, rotors in a Wankel type rotary engine chamber, for fulfilling the functions of the pistons described herein without departing from the teachings of this disclosure.

Figure 3:
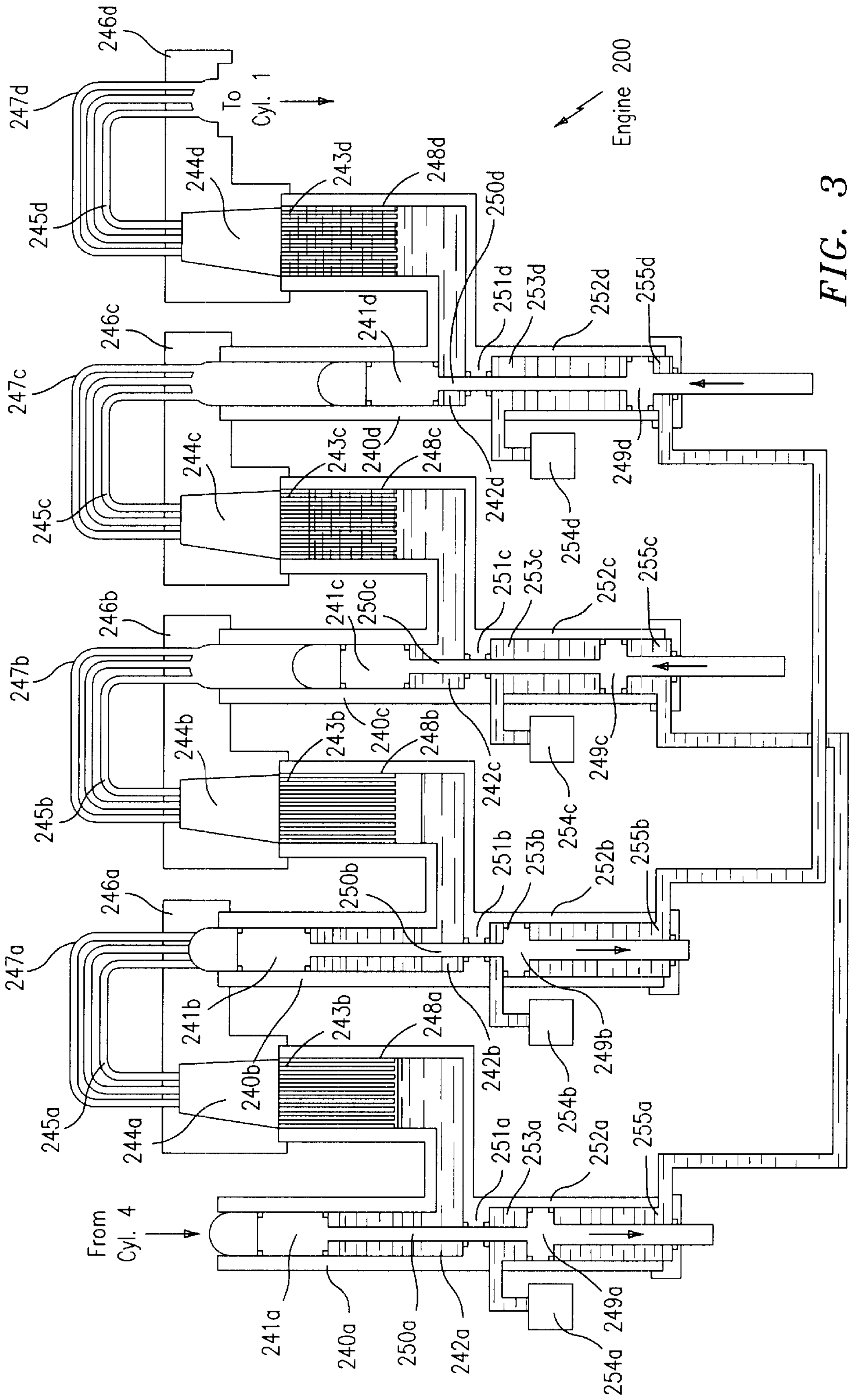
FIG. 3 is a schematic representation of a second exemplary embodiment Fluidic-Piston engine.

As shown in FIG. 3, an alternate exemplary embodiment Fluidic-Piston engine is indicated generally by the reference numeral 200. Engine 200 is an external combustion engine similar to engine 100 of FIG. 2, and therefore like reference numerals preceded by the numeral "2" are used to indicate like elements having like functionality. Engine 200 includes a plurality of rigid pistons 241*a*–241*d* disposed in a plurality of corresponding cylinders 240*a*–240*d*, respectively. The cylinders 240*a*–240*d* are formed in a cylinder block (not shown), which may include cylinder heads 246*d* or 246*a*–246*c*. Each rigid piston 241*a*–241*d* is in contact along its bottom surface with a corresponding fluidic piston 242*a*–242*d*, respectively.

Each cylinder 240*a*–240*d* defines a compression space 243*a*–243*d*, respectively, defined by the volume above each fluidic piston 242*a*–242*d*, respectively, and below each regenerator 244*a*–244*d*, respectively; and an expansion space 245*d* or 245*a*–245*c* defined by the volume above each rigid piston 241*a*–241*d*, respectively, and above each regenerator 244*d* or 244*a*–244*c*, respectively. The compression space 243*a*–243*d* of each cylinder 240*a*–240*d*, respectively, is thermodynamically coupled to a corresponding heat exchanger or regenerator 244*a*–244*d*, respectively, and connected to the expansion space 245*a*–245*d*, respectively, of an adjacent cylinder 240*b*–240*d* or 240*a*, respectively, via associated passageways 247*a*–247*d*, respectively. For example, the compression space 243*a* of cylinder 240*a* is connected through passageways 248*a* to the regenerator 244*a*, and, in turn, through the passageways 247*a* to the expansion space 245*a* of the adjacent cylinder 240*b*.

The exemplary engine 200 includes a second set of pistons 249*a*–249*d*, which are directly connected to pistons 241*a*–241*d*, respectively, in an axial relationship. Pistons 249*a*–249*d* are connected to pistons 241*a*–241*d*, respectively, via shafts 250*a*–250*d*, respectively, passing through shaft ports 251*a*–251*d*, respectively, which may be formed entirely within the cylinder block to effectively seal the shaft. The second set of pistons 249*a*–249*d* are housed within cylinders 252*a*–252*d*, respectively. Each cylinder 252*a*–252*d* includes a volumetric space 253*a*–253*d*, for hydraulic fluid to ingress and egress during each stroke.

The compressive force is transferred to each piston 249*a*–249*d* by the expansive force applied to the oppositely phased piston 249*c*–249*d* and 249*a*–249*b*, respectively, acting on a hydraulic fluid circuit 255*a*–255*d*, respectively. Thus, the fixed phase relationship is maintained between oppositely phased cylinders 240*a* and 240*c*, as well as between 240*b* and 240*d*, while using a portion of the kinetic energy produced by the expansion cycle of one cylinder to produce the work required by the compression cycle of an oppositely phased cylinder 240*c*–240*d* or 240*a*–240*b*, respectively. Due to the inherent operational symmetry of the engine 200, the reversing of this process occurs during the second half-cycle time for the engine. Therefore, any pair of linked pistons belonging to two oppositely phased cylinders will oscillate substantially in reciprocal register with one another.

Figure 4:
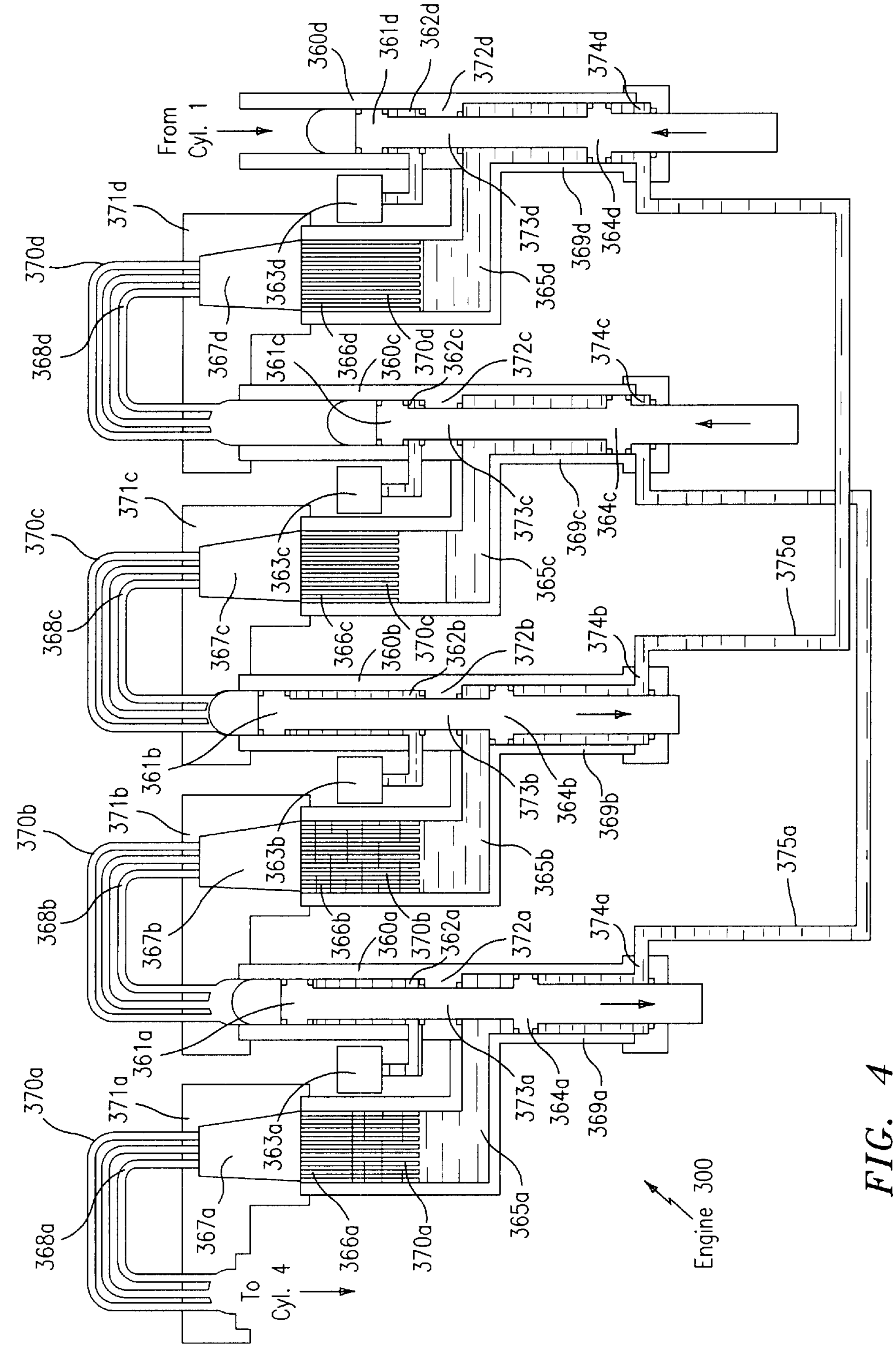
FIG. 4 is a schematic representation of a third exemplary embodiment Fluidic-Piston engine.

Turning now to FIG. 4, an alternate exemplary embodiment Fluidic-Piston engine is indicated generally by the reference numeral 300. The Fluidic-Piston engine 300 primarily differs from engine 200 in that the power valve 254 of FIG. 3 has been relocated from the expansion side of paired power piston 249 of FIG. 3 to the compression side of power piston 241 of FIG. 3. However, new reference numerals will be used for clarity.

Engine 300 includes a plurality of rigid pistons 361*a*–361*d* disposed in a plurality of corresponding cavities or cylinders 360*a*–360*d*, respectively. The cylinders 360*a*–360*d* are formed in a cylinder block (not shown), which may include cylinder heads 371*a*–371*d*. Each rigid piston 361*a*–361*d* is in contact along its bottom surface with an hydraulic fluid in a volumetric space 362*a*–362*d*. The volumetric spaces 362*a*–362*d* are open to hydraulic valves 363*a*–363*d*, respectively, for hydraulic fluid to ingress and egress by pumping action during each stroke. This pumped hydraulic fluid is used by a hydraulic motor (not shown) to generate rotary or other designed output motion.

Each cavity 360*a*–360*d* defines a compression space 366*a*–366*d*, respectively, defined by the volume above a fluidic piston 365*a*–365*d*, respectively, and below a regenerator 367*b*–367*d* or 367*a*, respectively; and an expansion space 368*a*–368*d* defined by the volume above each rigid piston 361*a*–361*d*, respectively, and above each regenerator 367*a*–367*d*, respectively. The compression space 366*a*–366*d* of each cavity 360*a*–360*d*, respectively, is thermodynamically coupled to the corresponding heat exchanger or regenerator 367*a*–367*d*, respectively, and open to the expansion space 368*a*–368*d*, respectively, of an adjacent cylinder 360*d* or 360*a*–360*c*, respectively, via associated passageways 370*a*–370*d*, respectively. For example, the compression space 366*a* of cavity 360*a* is open through passageways 370*a* to the regenerator 367*a*, and, in turn, to the expansion space 368*a* of the adjacent cylinder 360*d*.

The exemplary engine 300 includes a second set of pistons 364*a*–364*d*, which are directly rigidly connected to pistons 361*a*–361*d*, respectively, in an axial relationship. Pistons 364*a*–364*d* are connected to pistons 361*a*–361*d*, respectively, via shafts 373*a*–373*d*, respectively, passing through shaft ports 372*a*–372*d*, respectively, which may be formed entirely within the cylinder block to effectively seal the shaft. The second set of pistons 364*a*–364*d* is housed within cavities or cylinders 369*a*–369*d*, respectively. Each cylinder 369*a*–369*d* includes a volumetric space spanned by the fluidic piston 365*a*–365*d*, respectively, for the fluidic piston to ingress and egress therefrom during each stroke. The compressive force is transferred to each piston 365*a*–365*d* by the expansive force applied to the corresponding piston 364*a*–364*d*, respectively.

The compressive force is transferred to each piston 364*a*–364*d* by the expansive force applied by the corresponding piston 364*c*–364*d* or 364*a*–364*b*, respectively, acting through a hydraulic fluid circuit 375*a*–375*b*, respectively. Thus, the fixed phase relationship is maintained between oppositely phased pistons 361*a*–361*d* while using a portion of the kinetic energy produced by the expansion cycle of one cylinder to produce the work required by the compression cycle of an oppositely phased cylinder 360*c*–360*d* or 360*a*–360*b*, respectively. Due to the inherent operational symmetry of the engine 300, the reversing of this process occurs during the second half-cycle time for the engine. Therefore, any pair of linked pistons belonging to two oppositely phased cylinders will oscillate substantially in reciprocal register with one another.

Thus, in the engine 300, the piston 364*a*–364*d* is acted on by both the direct expansive force of 361*a*–361*d* in the expansion mode, and the hydraulic fluid from the hydraulic passageways 375*a*–375*b* resulting from the expansive force of pistons 361*c*–361*d* or 361*a*–361*b*, respectively.

This embodiment exhibits improved efficiency because the power output to the hydraulic motor is not first transferred to the coupled piston while incurring frictional losses as in engine 200, but is received directly from the compression side of piston 364*a*–364*d* while the lesser power required to compress the oppositely phased piston is transferred indirectly via hydraulic passageways 375*a*–375*b*, thereby incurring reduced frictional losses due to the reduced mass flow or power transfer. Alternate embodiments based on engine 300 may also utilize the articulated mechanical linkage 155*a* as described for engine 100.

Figure 5:
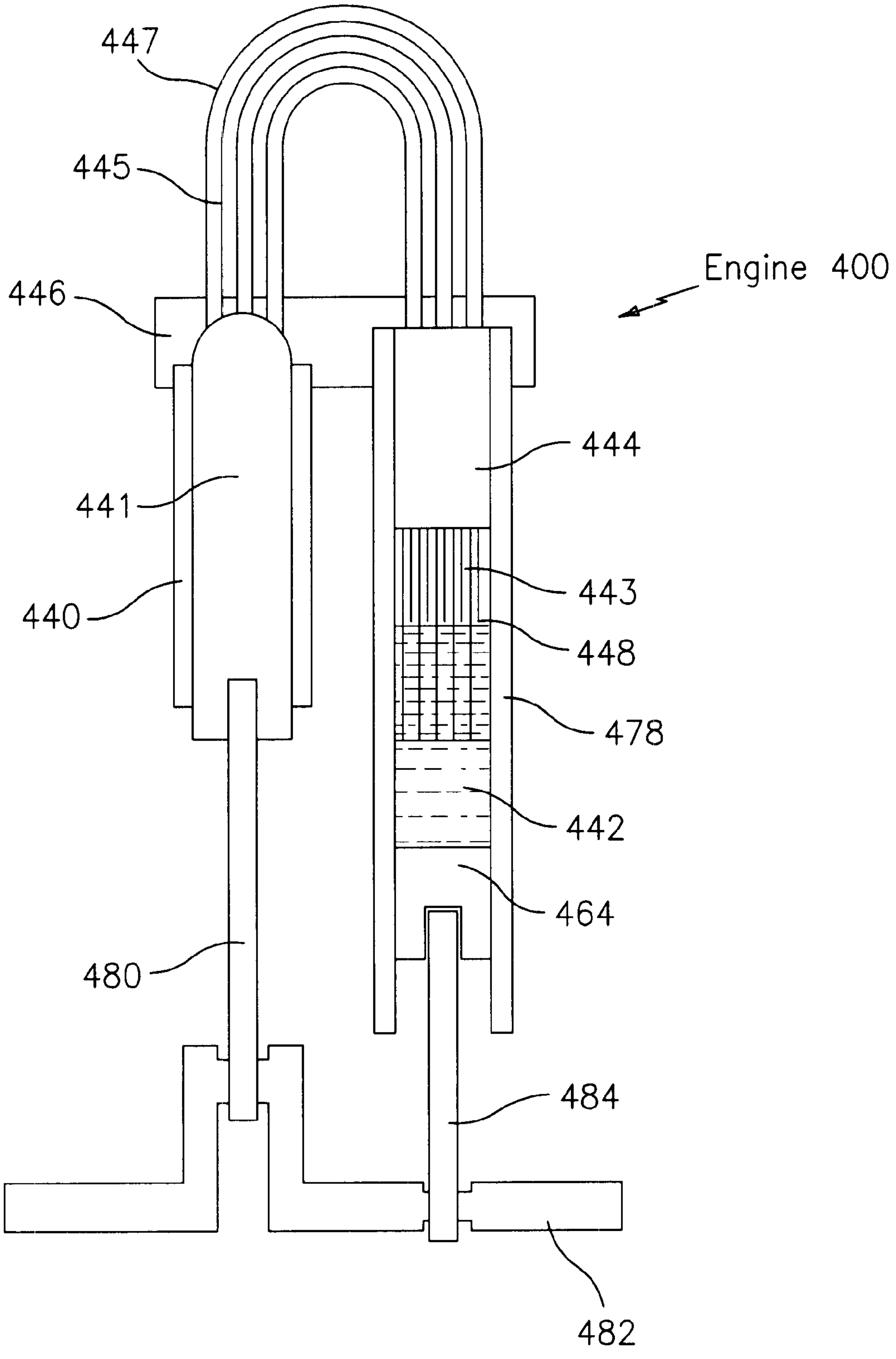
FIG. 5 is a schematic representation of a fourth exemplary embodiment Fluidic-Piston engine.

As shown in FIG. 5, an alternate exemplary embodiment Fluidic-Piston engine is indicated generally by the reference numeral 400. Engine 400 is an external combustion engine similar to engine 100 of FIG. 2, and therefore like reference numerals preceded by the numeral "4" are used to indicate like elements having similar functionality. Engine 400 includes a rigid power piston 441 disposed in a first cylinder 440, and a rigid compression piston 464 disposed in a second cylinder 478. The cylinders 440, 478 are formed in a cylinder block (not shown), which is connected at its upper surface to a cylinder head 446. Alternatively, the cylinder head 446 may be formed as an integral part of the cylinder block (not shown). The rigid power piston 441 is connected at its lower end to the upper end of a first connecting rod 480, which, in turn, is connected at its lower end to a crankshaft 482. The crankshaft 482 is connected to the lower end of a second connecting rod 484 having a fixed rotational phase delay of about 90 degrees relative to the first connecting rod 480. The second connecting rod 484 is connected at its upper end to the lower end of the rigid compression piston 464. The rigid compression piston 464 is adjacent at its upper surface to a fluidic piston 442.

The cylinder 478 defines a compression space 443 in the volume above the fluidic piston 442 and below a regenerator 444, which is located at the upper end of the cylinder 478 in this exemplary embodiment. The volume above the rigid piston 441 and above the regenerator 444 defines an expansion space 445. The expansion space includes the volumes within the elongated hot heat exchanger 447, which are open at their first ends to the portion of the expansion space immediately above the rigid power piston 441, and at their second ends to the upper end of the regenerator 444. The compression space 443 of the cylinder 478 is thermodynamically coupled to the regenerator 444 via a cold heat exchanger 448. The hot heat exchanger 447 includes three elongated tubes in this embodiment, although any number of shaped passageways may be used in alternate embodiments for fulfilling the functions of the hot heat exchanger described herein. The cold heat exchanger 448 includes five elongated tubes in this embodiment, although any number of shaped passageways may be used in alternate embodiments for fulfilling the functions of the cold heat exchanger described herein.

In operation, an external combustion heat source is applied to the hot heat exchanger 447 to cause heating of a substantially isochoric volume of working fluid as the power piston 441 travels from about the top of its travel down to about the mid-point of its travel while the fluidic piston travels from about the half-displacement point of its travel to the top of its travel. Next, substantially isothermal expansion of the working fluid takes place as the power piston 441 travels from about the mid-point of its travel to about the bottom of its travel while the fluidic piston 442 travels from about the top of its travel to about the half-displacement point of its travel. Following this expansion, substantially isochoric cooling of this volume of working fluid takes place as the power piston 441 travels from about the bottom of its travel to about the mid-point of its travel while the fluidic piston 442 travels from about the half-displacement point of its travel to about the bottom of its travel, thereby cooling a substantial portion of the working fluid by heat conduction and convection with the cold heat exchanger 448. Finally, substantially isothermal compression takes place as the power piston 441 travels from about the mid-point of its travel to about the top of its travel while the fluidic piston 442 travels from about the bottom of its travel to about the half-displacement point of its travel, thereby completing the cycle.

Thus, the fluidic piston 442 substantially increases the thermodynamic efficiency of practical embodiments of Fluidic-Piston Stirling engines by expelling the working fluid from the internal passages of the cold heat exchanger during the substantially isochoric heating phase of the cycle. In alternate embodiments, such as, for example, those utilizing fluidic pistons having very low thermal conductivity and density, the fluidic pistons may also displace working fluid from the regenerators. The fluidic piston 442 is maintained separate from the working fluid by means of gravity. Thus, the fluidic piston has a specific density greater than that of the working fluid, and the cylinder 478 is oriented vertically with the fluidic piston 442 disposed below the working fluid.

When the expanding working fluid forces the power piston 441 downwards, it causes the connecting rod 480 to apply positive work to the crankshaft 482. The crankshaft 482 has a finite rotational inertia resulting in storage of kinetic energy in the crankshaft 482. Once the power piston 411 reaches the bottom of its travel, it begins moving upward by means of an upward force applied by the crankshaft 482 through the connecting rod 480. At the same time, the fluidic piston begins moving downwards by means of a downward force applied by the high-pressure working fluid through the connecting rod 484 and the compression piston 464. Once the compression piston 464 reaches the bottom of its travel, it begins to move upward by means of an upward force applied by the crankshaft 482 through the connecting rod 484. This combination of the upward motion of the power piston 441 and the downward motion of the fluidic piston 442 results in a substantially isochoric phase wherein the volume of the working fluid remains substantially constant while its temperature is reduced via thermodynamic transfer of heat to the regenerator 444 and the cold heat exchanger 448.

Although the fluidic piston is a compression piston in the above-described exemplary embodiment, it is contemplated that the fluidic piston may serve as an expansion piston in alternate embodiments. As may be recognized by those of ordinary skill in the pertinent art, other possible configurations of the fluidic piston 442 are contemplated as new fluids are encountered for serving the purposes of the working fluid and/or the fluidic piston. For example, a magnetorheological fluid may be used as the fluidic piston 442 in combination with a magnetic compression piston 464 in order to substantially eliminate the reliance on gravity to keep the fluidic piston intact as shown in this exemplary embodiment. Other fluids may also be substituted for the fluidic piston 442 that would generally exhibit substantial incompressibility, low viscosity, and low thermal conductivity in order to fulfill the functions of the exemplary fluidic piston described herein.

As may also be recognized by those of ordinary skill in the pertinent art, an alternate fluidic piston may be added directly above the power piston 441 along with geometrical or other minor modifications, if necessary, to prevent the alternate fluidic piston from substantially mixing with the working fluid and/or substantially entering the regenerator 444. However, the type of fluid used for the alternate piston would have more stringent thermal breakdown requirements than that of the fluidic piston 442 due to its direct contact with the hot heat exchanger 447 and the heated working fluid therein.

A balancing of the overall engine torque for a four-cycle engine constrains the "optimal" minimum number of like cylinders to four. However, a lesser total number of cylinders is also realizable in alternate embodiment engines if the dynamic balancing requirement is relaxed, as is permissible for lower speed engines. In addition, although the exemplary engine 100 shows piston sets that are substantially identical, the coupling of two un-identical pistons (such as, for example, having different diameters and/or temperature ranges) that share a common linkage is possible and is contemplated as part of this disclosure. In addition, those of ordinary skill in the pertinent art will recognize, based on the teachings herein, that an Ericsson type engine may be provided by incorporating associated pressure valves between the individual passageways **147*a*–147*d* and 148*a*–148*d***.

According to these exemplary embodiments of the Fluidic-Piston engine, the components of engines 100, 200, 300 and 400, such as the heat exchangers and regenerators, may be formed of a high temperature conductive material to increase the overall efficiency by allowing faster and more complete heat transfer to occur between the various critical components. A current example of such a high temperature conductive material is Inconel® or nickel-based alloy steel. In addition, the Fluidic-Piston engine operates at a relatively low frequency in order to reduce viscous losses and enhance the heat exchanger efficiency; typically from an upper frequency of about 50 Hz, with an upper frequency of about 35 Hz desired, and an upper frequency of about 20 Hz more desired; to a lower frequency of about 0.5 Hz, with a lower frequency of about 2.5 Hz desired, and a lower frequency of about 5 Hz more desired.

Thus, a Fluidic-Piston engine is configured for increased efficiency and useful life. The engine includes mechanically and/or hydraulically coupled piston pairs. A first set of pistons is disposed in a first set of cylinders and a second set of pistons is disposed in a second set of cylinders. A piston in the second set of pistons is mechanically and/or hydraulically connected to a piston in the first set of pistons in an opposing relation, thereby defining a pair of connected pistons. The pair of pistons is thus adapted to oscillate in reciprocal register with one another. Thus, a piston in an expansion mode drives an oppositely disposed piston in a displacement mode. Because adjacent pistons operate independently in that no direct mechanical or hydraulic coupling exists, adjacent pistons are driven based on substantially optimized operating parameters.

Accordingly, an advantage of embodiments of the Fluidic-Piston engine is the reduced leakage of working fluid at the engine seals due to the additional sealing provided by the liquid to gas barrier of the fluidic piston to working fluid interface. Another advantage of embodiments of the Fluidic-Piston engine is reduced packaging requirements due to the similar vertical orientation of all power pistons made possible by the provision of the non-rigid interconnections between cylinders. Yet another advantage of the Fluidic-Piston engine is increased engine efficiency due to the optimization of the instantaneous phase angle difference permissible between a power piston and an adjacent compression piston acting on the same mass of working fluid. Another, more specific, advantage of the Fluidic-Piston engine is increased kinetic energy output of the engine due to substantially complete evacuation of the working fluid from the cold heat exchanger during the compression and heating phases of the engine cycle. Another more specific advantage of the Fluidic-Piston engine is reduced frictional losses and wear of the seals due to lubrication from the fluid.

While the invention has been described with reference to exemplary embodiments, it will be understood by those of ordinary skill in the pertinent art that various changes may be made and equivalents may be substituted for the elements thereof without departing from the scope of the disclosure. In addition, numerous modifications may be made to adapt the teachings of the disclosure to a particular object, material or situation without departing from the essential scope thereof. Therefore, it is intended that the Claims not be limited to the particular embodiments disclosed as the currently preferred best modes contemplated for carrying out the teachings herein, but that the Claims shall cover all embodiments falling within the true scope and spirit of the disclosure.

What is claimed is:

1. A heat engine comprising:

a plurality of cavities, each cavity comprising:

an expansion space in fluid communication with a compression space;

a heat exchanger positioned between the expansion space and the compression space such that fluid traveling from one to the other passes through the heat exchanger;

a rigid piston set comprising a set of pistons that move together;

an expansion piston comprising a first surface of said piston set, the first surface defining a wall of the expansion space;

a compression piston defining a wall of the compression space, said compression piston being a fluidic piston, fluid of said fluidic piston substantially filling a fluidic passageway extending from said compression space to a second surface of an adjacent piston set of an adjacent one of said plurality of cavities; and said engine further comprising a set of transfer pistons, each comprising a third surface of said piston set, for generating hydraulic power.

2. A method of operating an external combustion engine having a piston disposed relative to a mass of compressible working fluid, a hot heat exchanger and a cold heat exchanger in thermodynamic communication with the working fluid, said cold heat exchanger comprising plurality of shaped passageways of increased surface area to volume ratio and improved heat transfer, and a fluidic piston in fluid communication with the working fluid; the method comprising:

heating the working fluid with the hot heat exchanger;

expanding the working fluid against the piston in response to said heating;

cooling the working fluid with the cold heat exchanger by passing said working fluid through or around said plurality of passageways;

compressing the working fluid in response to said cooling; and moving the fluidic piston to displace the working fluid from the cold heat exchanger.

3. An engine as defined in claim 1 wherein said second surface of said piston set is formed on a common piston head with said first surface.

* * * * *